(12) United States Patent
Chaudhuri et al.

(10) Patent No.: US 9,854,483 B2
(45) Date of Patent: Dec. 26, 2017

(54) METHODS AND SYSTEMS FOR X2 LINK MANAGEMENT IN WIRELESS COMMUNICATION NETWORKS

(71) Applicant: Wipro Limited, Bangalore (IN)

(72) Inventors: Saptarshi Chaudhuri, Bangalore (IN); Avijit Manna, Kolkata (IN); Shyam Sundar Pal, Kolkata (IN)

(73) Assignee: WIPRO LIMITED, Bangalore (IN)

(*) Notice: Subject to any disclaimer, the term of this patent is extended or adjusted under 35 U.S.C. 154(b) by 126 days.

(21) Appl. No.: 14/885,089

(22) Filed: Oct. 16, 2015

(65) Prior Publication Data

US 2017/0055185 A1 Feb. 23, 2017

(30) Foreign Application Priority Data

Aug. 19, 2015 (IN) .......................... 4343/CHE/2015

(51) Int. Cl.
*H04W 36/00* (2009.01)
*H04W 92/20* (2009.01)

(52) U.S. Cl.
CPC ....... *H04W 36/0061* (2013.01); *H04W 92/20* (2013.01); *H04W 36/0083* (2013.01)

(58) Field of Classification Search
CPC .................................................. H04W 92/20
See application file for complete search history.

(56) References Cited

U.S. PATENT DOCUMENTS

| 2011/0243024 | A1* | 10/2011 | Osterling | H04L 67/104 370/252 |
| 2012/0258719 | A1 | 10/2012 | Fujito et al. | |
| 2012/0302240 | A1* | 11/2012 | Tamaki | H04W 36/0011 455/436 |
| 2015/0094114 | A1* | 4/2015 | Rao | H04W 52/245 455/522 |

(Continued)

FOREIGN PATENT DOCUMENTS

WO WO 2010/006203 1/2010

OTHER PUBLICATIONS

"Backhauling X2", *Cambridge Broadband Networks*, Apr. 30, 2011, pp. 1-13.

(Continued)

*Primary Examiner* — Xavier Szewai Wong
(74) *Attorney, Agent, or Firm* — Finnegan, Henderson, Farabow, Garrett & Dunner LLP (57) ABSTRACT

This disclosure relates generally to wireless communication networks, and more particularly to methods and systems for managing X2 links in wireless communication networks. In one embodiment, a method includes computing a set of configuration parameters associated with at least one Neighboring Base Station (NBS) using measurement reports received from a plurality of User Equipment (UEs). Thereafter, the method includes determining feasibility of setting up at least one X2 link between a Serving Base Station (SBS) and the at least one NBS based on at least one configuration parameter. Based on the feasibility, the at least (Continued)

one X2 link are created by performing one of activation of an X2 link and initiation of setup of an X2 link for each of the at least one X2 link. Finally, the method includes consolidating the at least one of X2 links based on associated current usage and associated predicted future usage.

20 Claims, 6 Drawing Sheets

(56) References Cited

U.S. PATENT DOCUMENTS

| | | | |
|---|---|---|---|
| 2015/0257051 A1* | 9/2015 | Rao | H04W 36/0061 455/439 |
| 2015/0373660 A1* | 12/2015 | Gunnarsson | H04W 56/0045 370/350 |
| 2016/0037399 A1* | 2/2016 | Li | H04W 36/0061 455/436 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard, 3GPPTS 36.300. No. V8.5.0, May 1, 2008, pp. 1-134.

"3$^{rd}$ Generation Partnership Project; Technical Specification Group Radio Access Network; Evolved Terrestrial Radio Access (E-UTRAN), X2 application protocol (X2AP) (Release 13)", 3GPP Standard, EBPPTS36.423. vol. Ran WB3, No. V13.0.0., Jun. 30, 2015, pp. 1-209.

European Search Report dated Jun. 6, 2016 in European Patent Office in counterpart European Patent No. Application 15202237.2, 16 pages.

* cited by examiner

METHODS AND SYSTEMS FOR X2 LINK MANAGEMENT IN WIRELESS COMMUNICATION NETWORKS

PRIORITY CLAIM

This U.S. patent application claims priority under 35 U.S.C. §119 to India Application No. 4343/CHE/2015, filed Aug. 19, 2015. The entire contents of the aforementioned application are incorporated herein by reference.

TECHNICAL FIELD

This disclosure relates generally to wireless communication networks, and more particularly to methods and systems for X2 link management in wireless communication networks.

BACKGROUND

In Long Term Evolution (LTE) networks, automatic optimization of the wireless networks to reduce operating cost is comparatively complex when compared to other wireless networks. The complexity is because of requirement of multiple network and geographical parameters. Initially, the primary focus in implementation of LTE networks was on the radio coverage. However, with the increase in the number of subscriber and corresponding increase in demand of services, for example, Multimedia Online Gaming (MMOG), Mobile TV, Web 2.0, High Definition video streaming, Live meeting, increasing capacity of the LTE network to the expected levels without compromising the quality of service has become a challenge.

Moreover, in broadband wireless network, for example, LTE, several Evolved Node Base Stations (eNBs) are deployed to provide the desired service coverage to user of a User Equipment (UE). Two eNBs are connected through an X2 interface, which is used to exchange application level configuration data required for two BSs to interoperate correctly. This configuration data is used for various functionalities, for example, "Handover", "X2 reset", and "eNB configuration update." However, X2 link creation for handover of a UE to a neighbouring eNB within a preferred time period is a limitation. This impacts efficient and smooth handover of a UE, thus affecting service quality received by an end user and cost of operations.

SUMMARY

In one embodiment, a method of managing X2 links in a wireless communication network is disclosed. The method includes computing a set of configuration parameters associated with at least one Neighboring Base Station (NBS) using measurement reports received from a plurality of User Equipment (UEs) communicating with the at least one NBS; determining feasibility of setting up at least one X2 link between a Serving Base Station (SBS) and the at least one NBS based on at least one configuration parameter in response to receiving an X2 link set up request; creating, in response to determining the feasibility, the at least one X2 link by performing one of activation of an X2 link and initiation of setup of an X2 link for each of the at least one X2 link based on a current status of each of the at least one X2 link, wherein a current status of an X2 link comprises one of a new link setup requirement and activation of an already established X2 link for one of the at least one NBS; determining current usage of each of the at least one X2 link created between the SBS and one of the at least one NBS; predicting future usage of each of the at least one X2 link based on UE measurement reports received from the plurality of UEs and at least one configuration parameter; and consolidating the at least one of X2 links based on the current usage and the predicted future usage.

In another embodiment, a system for managing X2 links in a wireless communication network is disclosed. The system includes at least one processors and a computer-readable medium storing instructions that, when executed by the at least one processor, cause the at least one processor to perform operations comprising: computing a set of configuration parameters associated with at least one NBS using measurement reports received from a plurality of UEs communicating with the at least one NBS; determining feasibility of setting up at least one X2 link between an SBS and the at least one NBS based on at least one configuration parameter in response to receiving an X2 link set up request: creating, in response to determining the feasibility, the at least one X2 link by performing one of activation of an X2 link and initiation of setup of an X2 link for each of the at least one X2 link based on a current status of each of the at least one X2 link, wherein a current status of an X2 link comprises one of a new link setup requirement and activation of an already established X2 link for one of the at least one NBS; determining current usage of each of the at least one X2 link created between the SBS and one of the at least one NBS; predicting future usage of each of the at least one X2 link based on UE measurement reports received from the plurality of UEs and at least one configuration parameter; and consolidating the at least one of X2 links based on the current usage and the predicted future usage.

In yet another embodiment, a non-transitory computer-readable storage medium for managing X2 links in a wireless communication network is disclosed, such that when executed by a computing device, the non-transitory computer-readable storage medium cause the computing device to compute a set of configuration parameters associated with at least one NBS using measurement reports received from a plurality of UEs communicating with the at least one NBS; determine feasibility of setting up at least one X2 link between a SBS and the at least one NBS based on at least one configuration parameter in response to receiving an X2 link set up request; create, in response to determining the feasibility, the at least one X2 link by performing one of activation of an X2 link and initiation of setup of an X2 link for each of the at least one X2 link based on current status of each of the at least one X2 link, wherein current status of an X2 link comprises one of a new link setup requirement and activation of an already established X2 link for one of the at least one NBS; determine current usage of each of the at least one X2 link created between the SBS and one of the at least one NBS; predict future usage of each of the at least one X2 link based on UE measurement reports received from the plurality of UEs and at least one configuration parameter; and consolidate the at least one of X2 links based on the current usage and the predicted future usage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, Illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
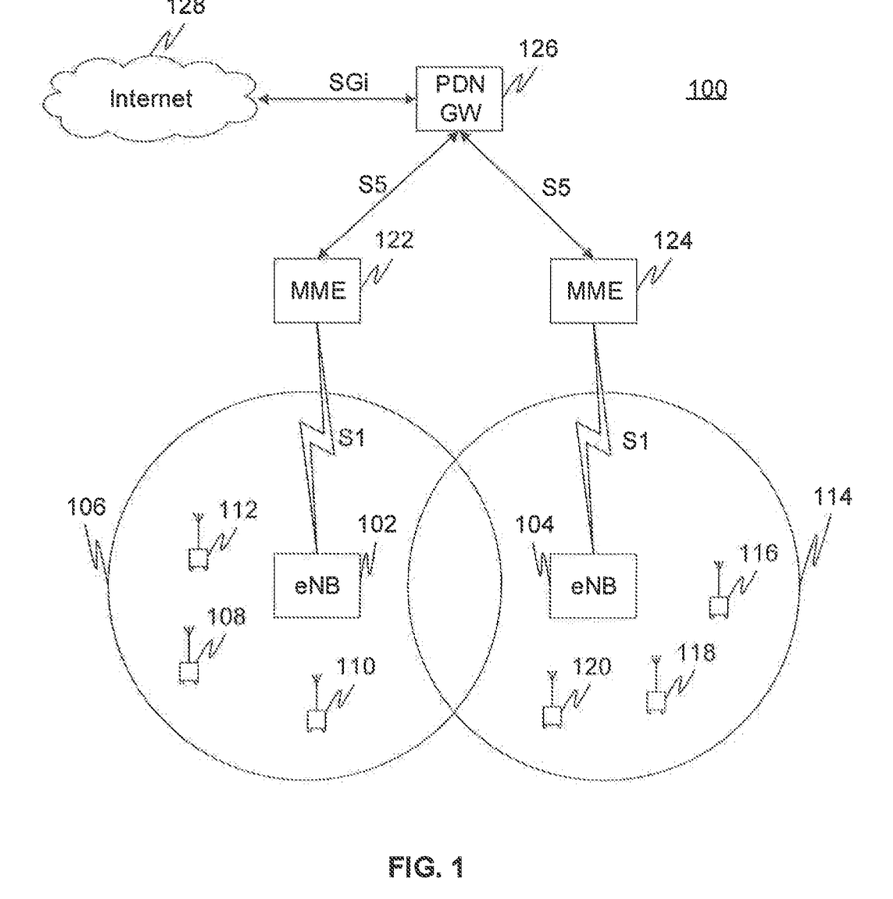
FIG. 1 illustrates an exemplary wireless communication network in which various embodiments may function.

Additional illustrative embodiments are listed below. In one embodiment, an exemplary wireless communication network 100 in which various embodiments may function is illustrated in FIG. 1. Wireless communication network 100 is a Long Term Evolution (LTE) network that includes an Evolved Node Base station (eNB) 102 and an eNB 104. Wireless communication network 100 may have more than two eNBs, such that one of the eNB acts as a Serving Base Station (SBS) and other eNBs act as Neighboring Base Stations (NBSs). For example, the SBS may have six associated NBSs. The eNB 102 has a coverage area 106 and communicates wirelessly with User Equipment (UE) 108, a UE 110, and a UE 112 within coverage area 106. The eNB 104 has a coverage area 114 and communicates wirelessly with UE 116, 118, and 120 within coverage area 114. Examples of a UE may include but are not limited to a cell phone, a smart phone, a tablet, a phablet, and a laptop. The eNB 102 and the eNB 104 form the evolved UMTS Terrestrial Radio Access Network (E-UTRAN) for wireless communication network 100.

The eNB 102 wirelessly communicates with a Mobility Management Entity (MME) 122 and the eNB 104 wirelessly communicates with a MME 124 using respective S1 interfaces. Each of MME 122 and MME 124 may be replaced by a Serving Gateway (S-GW). Each of MME 122 and MME 124 further communicate with a Packet Data Network Gateway (PDN-GW) 126 through respective S5 interfaces. PDN-GW 126 further connects wireless communication network 100 with Internet 128 through an SGi link.

It will be apparent to a person skilled in the art that wireless communication network 100 is not limited to an LTE network and may include but is not limited to Worldwide Interoperability for Microwave Access (WiMAX), Code Division Multiple Access (CDMA), Enhanced Data rates for GSM Evolution (EDGE), and High Speed Packet Access (HSPA). It will be further apparent to a person skilled in the art that for a wireless communication network other than LTE, network components and parameters associated with that wireless communication network will be used.

Figure 2:
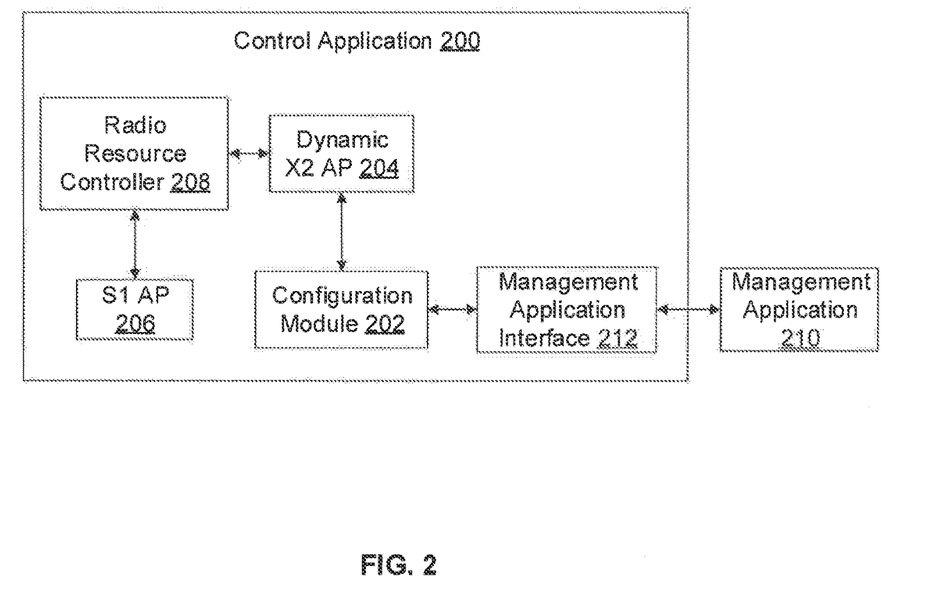
FIG. 2 is a block diagram illustrating communication of various components of a control application in a Base Station (BS), in accordance with an embodiment.

Referring now to FIG. 2, a block diagram for communication for various components of a control application 200 in a BS is illustrated, in accordance with an embodiment. Control application 200 includes a configuration module 202, a dynamic X2 Application Protocol (AP) 204, an S1 AP 206, and a Radio Resource Controller (RRC) 208. Configuration module 202 receives a set of configuration parameters from a Management Application (MA) 210 in the BS through an MA-Interface (MAI) 212 in control application 200. The set of configuration parameters may include, but is not limited to default Nearest Base Station (NBS) List, a measurement Timer, a Threshold Reference Signal Received Power (RSRP) Deviation, a default RSRP measurement range list, a threshold time Interval for link deactivation, a threshold non-usage time for an active X2 Link, a handover failure factor, a threshold number User Equipment (UEs), Quality Control Index (QCI) for UEs, maximum X2 links, and a radio link failure factor.

These set of configuration parameters are sent to dynamic X2 AP 204 during startup of the system, which are then loaded into its own persistent-memory. These configuration parameters are then used by dynamic X2 AP 204 for management of X2 links with one or more NBSs. The management of X2 links may include creation, tearing down, maintenance, or consolidation of one or more of the X2 links. To this end, dynamic X2 AP 204 communicates with S1 AP 206 and RRC 208. The set of configuration parameters, in an embodiment, may be represented and described by Table 1 given below:

TABLE 1

| Configuration Parameter | Symbol | Description |
| --- | --- | --- |
| Default NBS List | $NBS_{Default}$ | This configuration parameter is received from MA 210 during system initialization and may be used by dynamic X2 AP 204 to determine whether a UE handover to an NBS is possible. Additionally, this parameter is used to find the most suitable NBS for a UE handover. |
| Measurement Timer | $\delta_{mt}$ | This configuration parameter represents a time duration and is used by dynamic X2 AP 204 to trigger algorithm and to collecting measurement reports from a UE within coverage area of an associated NBS. |

TABLE 1-continued

| Configuration Parameter | Symbol | Description |
|---|---|---|
| Default RSRP Measurement Range List | List<$\rho_{RSRP\_Default}$> | This configuration parameter represents the default RSRP range for determining measurement report that are to be taken into consideration for X2 Link Management. It is used for area calculation and it may dynamically be changed based on the UE measurement report. |
| Threshold RSRP Deviation | SigDEV$_{Th}$ | This configuration parameter is used by dynamic X2 AP 204 to determine accurate Predicted RSRP. For example, the predicted RSRP may be re-calculated for every $\delta_{mt}$ interval so that the difference of predicted and measured RSRP is below the SigDEV$_{Th}$. |
| Threshold Time Interval for Link Deactivation | DeactTime$_{Th}$ | This configuration parameter is the time interval that is used by dynamic X2 AP 204 to decide whether an X2 link should be deactivated. For example, when an X2 link is not used for DeactTime$_{Th}$, it is teared down. |
| Threshold Non-usage Time for an Active X2 Link | NUTime$_{Th}$ | This configuration parameter is determined based on a predicted RSRP and is used by dynamic X2 AP 204 to determine whether an X2 link should be teared down based on its non-usage. For example, when an X2 link is not used for NUTime$_{Th}$, that link will be teared down. |
| Handover Failure Factor | HF$_{Fact}$ | This configuration parameter is used by dynamic X2 AP 204 for selecting an NBS for handover. For example, if HF$_{Fact}$ is more for a given NBS, then probability of X2 link creation to that NBS may reduce. |
| Threshold Number of User Equipments (UEs) | UE$_{Th}$ | This configuration parameter is used by dynamic X2 AP 204 to decide whether X2 AP handover should be initiated or not. For example, when the number of UEs is below UE$_{Th}$, then S1 handover is initiated by S1 AP 206 instead of X2AP handover. |
| Quality Control Index (QCI) for UEs | UE$_{Qci}$ | This configuration parameter is used by dynamic X2 AP 204 to determine whether a UE handover to an NBS should be performed. For example, if value of QCI for a UE is greater than UE$_{Qci}$ then X2 handover of the UE is initiated to avoid delay in handover. |
| Maximum X2 links | X2APLink$_{Max}$ | This configuration parameter indicates the maximum number of X2 links that can be created at any instance of time. If dynamic X2 AP 204 determines that X2APLink$_{Max}$ has been reached, then it takes a decision as to whether some X2 link shall be deleted for creating new X2 link or no further X2 links shall be created. |
| Radio Link Failure (RLF) Factor | RLF$_{Fact}$ | This configuration parameter is used by dynamic X2 AP 204 to select an NBS for handover. For example, a high RLF$_{Fact}$ would reduce the probability of creating an X2 link. |

Based on the management decision reached by dynamic X2 AP 204 using one or more of the set of configuration parameters, a new X2 link may be created with an NBS or an existing X2 link may be teared down or maintained for future use. Accordingly, dynamic X2 AP 204 updates information associated with the set of configuration parameters in its persistent-memory. This updated information is then sent to S1 AP 206 and RRC 208. Additionally, the updated information is sent to MA 210 through MAI 212. As a result, dynamic X2 AP 204 is able to dynamically manage X2 links with the one or more NBSs for resource optimization and maximum usage of these X2 links.

Figure 3:
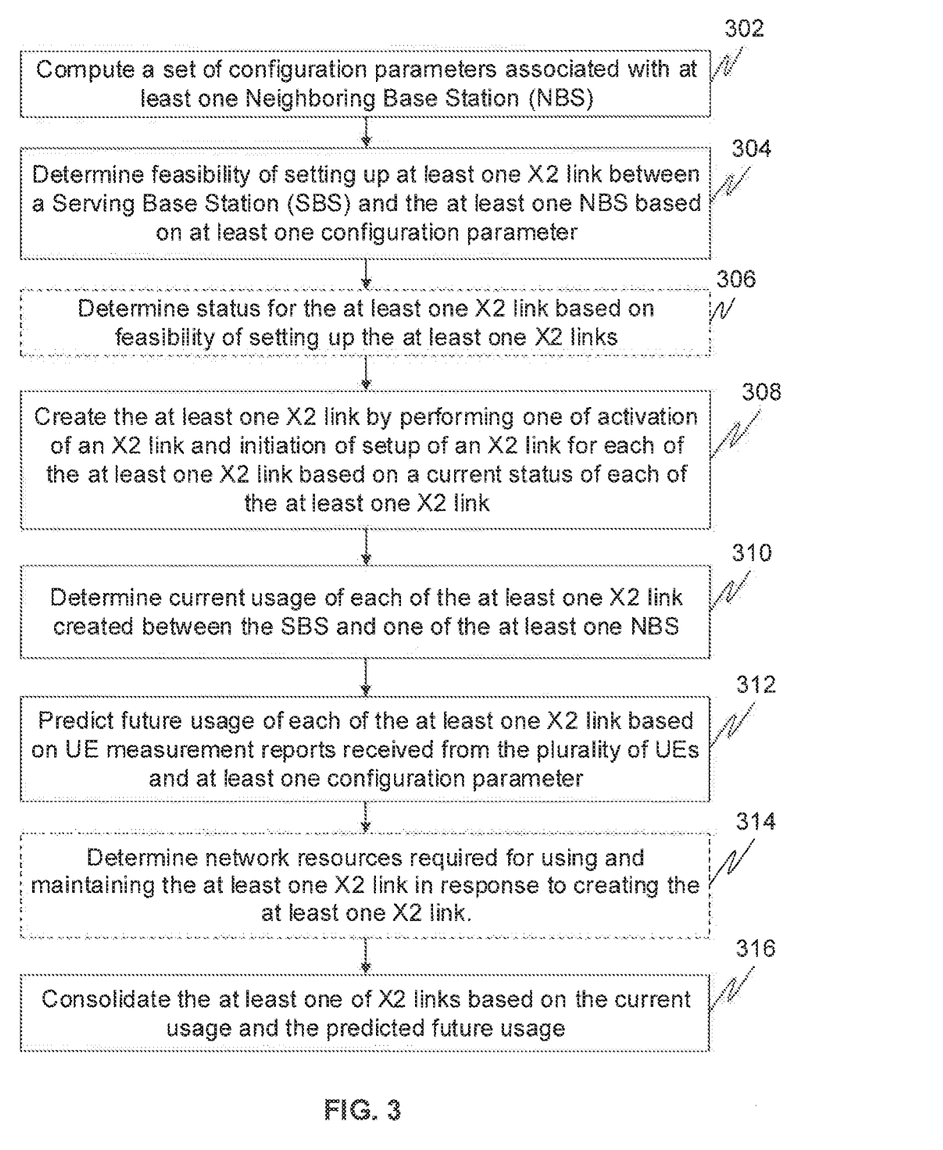
FIG. 3 illustrates a flowchart of a method for managing X2 links in a wireless communication network, in accordance with an embodiment.

Referring now to FIG. 3, a flowchart of a method for managing X2 links in a wireless communication network is illustrated, in accordance with an embodiment. At 302, MA 210 computes a set of configuration parameters associated with one or more NBSs using measurement reports received from a plurality of UEs communicating with the one or more NBSs. In an embodiment, an SBS has six NBSs with which it can establish X2 links. The set of configuration parameters may include but are not limited to limited to default NBS List, a measurement timer, a threshold RSRP deviation, a default RSRP measurement range list, a threshold time Interval for link deactivation, a threshold non-usage time for an active X2 Link, a handover failure factor, a threshold number UEs, QCI for UEs, maximum X2 links, and a radio link failure factor.

These set of configuration parameters are then received by configuration module 202, which stores them in its persistent memory and further shares them with dynamic X2 AP 204. Based on one or more of the set of configuration parameters, feasibility of setting up one or more X2 links between the SBS and the one or more NBSs in response to receiving an X2 link set up request is determined at 304. In an exemplary embodiment, the feasibility is determined as described below:

Step 1: Dynamic X2 AP 204 receives i$^{th}$ request for setup of an X2 link to one of the NBSs, until i<=NBS$_{Default}$;

Step 2: Dynamic X2 AP 204 analyzes resource availability for creating context by calculating network resource using equation 1 given below:

$$\text{Net}_{Resource} = N*[\text{NBS\_context} + X\text{2APLink\_MA} + X\text{2Link\_Resources}]*T \quad (1)$$

where,

N=Number of X2 links that is defined in a static configuration file,

T=Time duration of an active X2 link,

NBS_context=NBS memory context till the duration of X2 link,

X2APLink_MA=CPU utilization for continuous X2 link operation and maintenance,

X2Link_Resources=Resources like IP Address & Port Number required for an X2 link;

Step 3: Dynamic X2 AP 204 checks feasibility for X2 AP set up by extracting X2 link creation flag from the set of configuration parameters;

Step 4: Dynamic X2 AP 204 stores potential X2 link set up information into X2 link Information (X2LI), where, X2LI includes the necessary information for X2 link usage for particular period of configured time.

Thereafter, the status for the one or more X2 links may be determined based on feasibility of setting up these links at 306. In an exemplary embodiment, the status may be determined as described below:

Step 1: For each $j^{th}$ NBS in Array <$NBS_j$>, dynamic X2 AP 204 checks current status of an X2 link till (j<count (Array <$NBS_j$>)). Current status of an X2 link may include requirement of a new X2 link set up or activation of an already established X2 link;

Step 2: Dynamic X2 AP 204 stores the status of an X2 link in a Map<$NBS_j$, Status>.

At 308, in response to determining the feasibility, dynamic X2 AP 204 creates the one or more X2 links by performing one of activation of an X2 link and initiation of setup of an X2 link for each of the one or more X2 links. This link creation is done based on a current status of each of the one or more X2 links. Current status of an X2 link to an NBS may include a new link setup requirement. Alternatively, current status of an X2 link may include activation of an already established X2 link with an NBS. To create the one or more X2 links, a pre-initiation analysis may be performed for each X2 link. In an exemplary embodiment, the pre-initiation analysis may be performed as described below:

Step 1: For each NBS i in $NBS_i$ in Map <$NBS_j$, Status>, dynamic X2 AP 204 performs steps 2 and 4, until $NBS_i$<count (Map<$NBS_j$, Status>);

Step 2: Extract X2 link status for each NBS from Map<$NBS_j$, Status>;

Step 3: If status of an X2 link is "Set up" then dynamic X2 AP 204 sends the X2 AP set up request link to initiate X2 link set up. On the contrary, if the status is "Activate" then dynamic X2 AP 204 activates an X2 link by activating port and accordingly intimates an NBS;

Step 4: Dynamic X2 AP 204 then stores the updated X2 AP set up information in X2APLI.

Thereafter, at 310, current usage of each of the one or more X2 links created between the SBS and one of the one or more NBSs is determined. The current usage may be determined by analyzing handover reports associated with each of the one or more NBSs. In an exemplary embodiment, the current usage may be determined as described below:

Step 1: For each NBS i in $NBS_i$ (i<=NBS_Num), dynamic X2 AP 204 performs; steps 2 to 5, until (j<=NBS_Num), where, NBS_Num is the total number of NBS;

Step 2: Check the last X2 link usage using Handover Report (HR);

Step 3: Calculate $Ideal_{time}$ for an X2 link, where, $Ideal_{time}$ is the time that has elapsed for an X2 link in idle state;

Step 4: If $Ideal_{time}$>=$DeactTime_{Th}$, trigger event for X2 link shut down, where, $DeactTime_{Th}$ is threshold time for checking idle state of an X2 link;

Step 5: Store active X2 link in an Array<X2APAct, i> and inactive X2 link in an Array<X2APInact, i>.

In addition to determining current usage, dynamic X2 AP 204 predicts future usage of each of the one or more X2 links at 312. Future usage is predicted based on UE measurement reports received from the plurality of UEs and one or more configuration parameters. This is explained in detail in conjunction with FIG. 4. Thereafter, at 314, network resources required for using and maintaining the one or more X2 links is determined. In an exemplary embodiment, the network resources may be determined using equation 2 given below:

$$Net_{Resource}=N*[NBS\_context+X2APLink\_MA+X2Link\_Resources]*T \quad (2)$$

where, $Net_{Resource}$ is the required resource utilization for an X2 link set up or maintenance;

Based on the current usage, the predicted future usage, and network resource requirement, the one or more X2 links are consolidated at 316. This is further explained in detail in conjunction with FIG. 5.

In the above described method, as priority associated with UEs is determined along with X2 link usage pattern, optimum establishment of X2 links is enabled. This further results in limiting maximum X2 links of a BS, thereby optimizing load on the network. The priority determined for a UE is used to prioritize X2 link creation during handover for prioritized UEs, as a result, the quality of service is not impacted. Moreover, as the time period for which an active X2 link may remain unused is predicted, efficient termination (partial or full) of X2 links is enabled.

Figure 4:
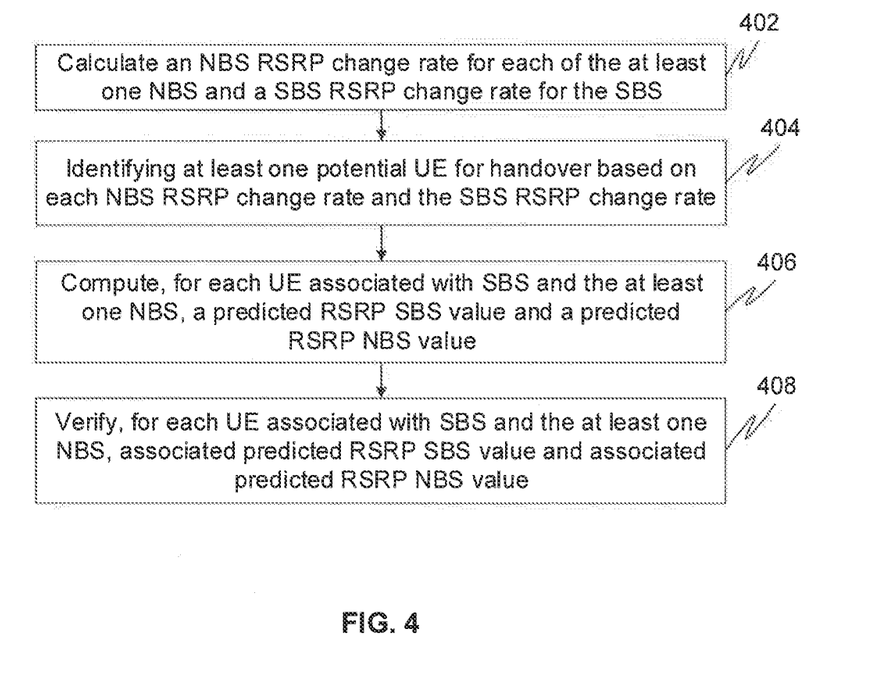
FIG. 4 illustrates a flowchart of a method for predicting future usage of X2 links, in accordance with an embodiment.

Referring now to FIG. 4, a flowchart of a method for predicting future usage of X2 links is illustrated, in accordance with an embodiment. At 402, dynamic X2 AP 204 calculates an NBS RSRP change rate for each of the one or more NBSs and an SBS RSRP change rate for the SBS based on associated consecutive UE measurement reports received from each UE. In other words, NBS RSRP change rate is calculated for a UE communicating with an NBS using measurement reports received from that UE. This is repeated for every UE communicating with the NBS and for every NBS communicating with the SBS. Additionally, SBS RSRP change rate is calculated for every UE communicating with the SBS. In an exemplary embodiment, an NBS RSRP change rate and SBS RSRP change rate may be determined as described below:

Step 1: Start Measurement Timer ($\delta_{mt}$);

Step 2: For each $i^{th}$ UE, receive Measurement Report ($MR_i$), repeat steps 3 to 8, until i<=UE_Num, where, UE_Num is the number of UEs;

Step 3: For each $j^{th}$ NBS in $MR_i$, repeat steps 4 to 8, until (j<=NBS_Num), where, NBS_Num is the number of NBSs;

Step 4: Extract UE reported RSRP: $RSRP_j$, from measurement report $MR_{i,j}$;

Step 5: Calculate NBS RSRP change using equation 3 given below:

$$RSRP_{\delta(i,j)nbs} = RSRP_{i,j} - RSRP_{i-1,j} \quad (3)$$

where, $RSRP_{\delta(i,j)nbs}$ is the change of RSRP in consecutive measurement reports of $i^{th}$ UE and $j^{th}$ NBS;

Step 6: Store $RSRP_{\delta(i,j)nbs}$ in a map, i.e., Map <$UE_i$, $RSRP_{\delta(i,j)nbs}$> in persistent memory of dynamic X2 AP 204;

Step 7: Calculate SBS RSRP change using equation 4 give below:

$$RSRP_{\delta i,sbs} = RSRP_i - RSRP_{i-1} \quad (4)$$

where, $RSRP_{\delta(i,sbs)}$ is the change of RSRP in consecutive measurement reports of $i^{th}$ UE and the SBS;

Step 8: Store $RSRP_{\delta(i,\ sbs)}$ in an array, i.e., Array<$UE_i$, $RSRP_{(\delta i,\ sbs)}$> in persistent memory of dynamic X2 AP 204

Using each NBS RSRP change, i.e., $RSRP_{\delta(i,j)nbs}$ calculated for the one or more NBSs and the SBS RSRP change, i.e, $RSRP_{\delta(i,sbs)sbs}$ calculated for the SBS, dynamic X2 AP 204 calculates NBS RSRP change rate for each UE associated with the one or more NBSs and SBS RSRP change rate for each UE associated with the SBS. In an exemplary embodiment, these RSRP change rate may be determined as described below:

For each NBS:

Step 1: For each $i^{th}$ UE and each $j^{th}$ NBS in Map<$UE_i$, $RSRP_{\delta(i,j)nbs}$>, dynamic X2 AP 204 repeats steps 2 and 3, until (i<=UE_Num) and (j<=NBS_Num);

Step 2: Calculate the RSRP change rate using equation 5 given below:

$$RSRP_{\Delta/t(i,j)} = (RSRP_{\delta(i,j)nbs}/\delta_{mt}) \quad (5)$$

where, $RSRP_\Delta$ contains received signal change in consecutive measurement reports obtained from a UE;

Step 3: Store $RSRP_{\Delta/t(i,j)}$ in an array Array <i, $RSRP_{\Delta/t(i,j)}$>;

For the SBS:

Step 1: For each $i_{th}$ UE in Map<$UE_i$, $RSRP_{\delta(i,j)sbs}$>, dynamic X2 AP 204 repeats steps 2 and 3, until (i<=UE_Num);

Step 2: Calculate the RSRP change rate using equation 6 given below:

$$RSRP_{\Delta/t(i)} = (RSRP_{\delta i,sbs}/\delta_{mt}) \quad (6)$$

where, $RSRP_\Delta$ contains received signal change in consecutive measurement report obtained from a UE;

Step 3: Store $RSRP_{\Delta/t(i)}$ in an array Array <i, $RSRP_{\Delta/t(i)}$>.

Using an NBS RSRP change rate calculated for each UE associated with the one or more NBS and an SBS RSRP change rate associated with each UE associated with the SBS, dynamic X2 AP 204 identifies one or more potential UEs for handover at 404. Thereafter, at 406, dynamic X2 AP 204 computes a predicted RSRP SBS value and a predicted RSRP NBS value for each UE associated with SBS and the one or more NBSs. In an exemplary embodiment, a predicted RSRP SBS value and a predicted RSRP NBS value for each UE may be determined as described below:

Step 1: For each $i_{th}$ UE and $j_{th}$ NBS, dynamic X2 AP 204 checks $RSRP_{\Delta/t(i)}$ and $RSRP_{\Delta/t(i)}$, until (i<=UE_Num) and (i<=NBS_Num);

Step 2: Calculate prediction time using equation 7 given below:

$$Pred_{Time} = \delta_{mt} + \Delta t \quad (7)$$

where, $Pred_{Time}$ is the time to predict the signal strength received by UE, $\delta_{mt}$ is measurement timer, $\Delta t$ is time elapsed after expiry;

Step 3: At $Pred_{Tk}$, predict the RSRPpred_sbs for SBS by using equation 8 and RSRPpred_nbs for each j in $NBS_j$ until (j<=NBS_Num) using equation 9 given below:

$$RSRPpred\_sbs = RSRP_{\delta mt} + (RSRP_{\Delta/t(i)} \times \Delta t) \quad (8)$$

$$RSRPpred\_nbs(j) = RSRP_{\delta mt} + (RSRP_{\Delta/t(i,j)} \times \Delta t) \quad (9)$$

Step 4: Store RSRPpred_sbs and RSRPpred_nbs(j) in a Map<i, <RSRPpred_sbs and RSRPpred_nbs(j)>>.

Associated predicated values are verified for each UE associated with SBS and the one or more NBSs by comparing with threshold limit of RSRP error deviation at 408. In an exemplary embodiment, verification may be performed as described below:

Step 1: For each $i_{th}$ UE in Map<i, <RSRPpred_sbs and RSRPpred_nbs(j)>>, dynamic X2 AP 204 perform steps 2 to 5 until (i<=UE_Num);

Step 2: At Validation timer ($\delta_{mt+1}$) calculate deviation using equation 10 given below:

$$RSRP_{dev} = RSRP(\delta_{mt+1}) - RSRPpred\_sbs \quad (10)$$

where, $RSRP_{dev}$ contains calculated deviation with the previous predicted RSRP and current predicted RSRP;

Step 3: If $RSRP_{dev} < SigDEV_{Th}$, store RSRPpred_sbs;

Step 4: For each j in $NBS_j$, until (<=NBS_Num), compute equation 11 given below:

$$RSRP_{dev(j)} = RSRP(\delta_{mt+1,j}) - RSRPpred\_sbs(j) \quad (11)$$

Step 5: If $RSRP_{dev(j)} < SigDEV_{Th}$ update Map<i, <RSRPpred_sbs and RSRPpred_nbs(j)>>

Figure 5:
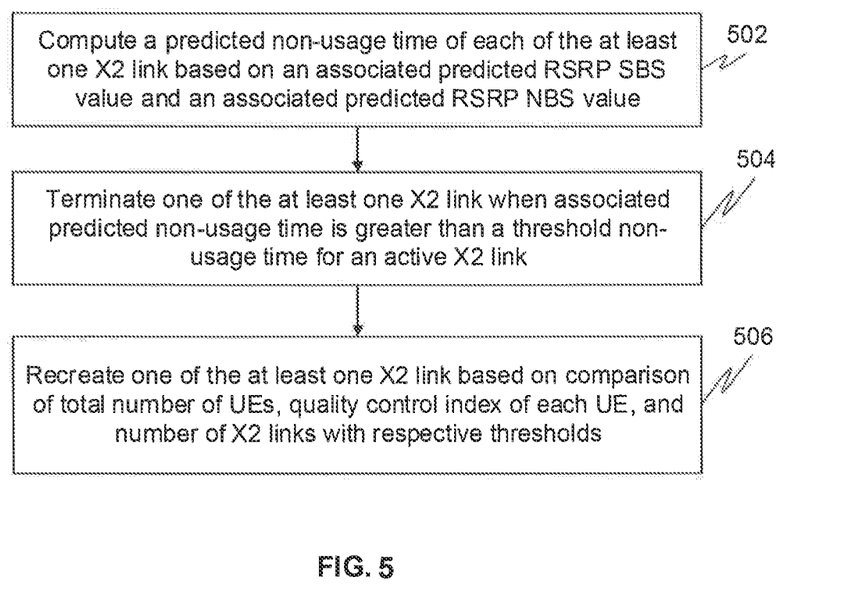
FIG. 5 illustrates a flowchart of a method for consolidating X2 links, in accordance with an embodiment.

Referring now to FIG. 5, a flowchart of a method for consolidating X2 links is illustrated, in accordance with an embodiment. At 502, dynamic X2 AP 204 computes a predicted non-usage time of each of the one or more X2 links based on an associated predicted RSRP SBS value and an associated predicted RSRP NBS value. Thereafter, at 504, dynamic X2 AP 204 may terminate one of the one or more X2 links, when associated predicted non-usage time is greater than a threshold non-usage time for an active X2 link. In an exemplary embodiment, predicted non-usage time may be computed as described below:

Step 1: For each $NBS_j$, dynamic X2 AP 204 performs steps 2 to 7, until (j<=NBS_Num);

Step 2: Extracts RSRPpred_sbs and RSRPpred_nbs(j) from Map<i, <RSRPpred_sbs and RSRPpred_nbs(j)>>;

Step 3: Calculate Non Usage time ($Time_{nu}$) based on RSRPpred_sbs and RSRPpred_nbs(j);

Step 4: Store X2 link information for termination where necessary in a Map<$NBS_j$, $term_j$>;

Step 5: Store X2 link information for deactivation where necessary in a Map<$NBS_j$, $deact_j$>;

Step 6: If $Time_{nu} > NUTime_{Th}$, then tear-down X2 link;

Step 7: Update Array<X2APAct,i> and Array<X2APterm,i>.

At 506, dynamic X2 AP 204 may recreate one of the one or more X2 links based on comparison of total number of UEs, quality control index of each UE, and number of X2 links with respective thresholds. In an exemplary embodiment, predicted non-usage time may be computed as described below:

Step 1: For each j in $NBS_j$ in Map<i, RSRPpred_nbs(j)>, perform steps 2 to 4, until (j<=NBS_Num);

Step 2: If $UE_{count}$>$UE_{Th}$, determine number of already created X2 Links (X2APcreated). Otherwise, check if UEQCI>UEQCI_th. If this is true, then again ($X2AP_{created}$) is determined, where, $UE_{count}$ is the number of UEs, $UE_{Th}$ is the threshold number of UEs;

Step 3: If $X2AP_{created}$>$X2APLink_{Max}$, terminate one or more X2 links. Otherwise, receives X2 Link usage information for $NBS_j$, where, $X2APLink_{Max}$ is the maximum number of X2 links;

Step 4: If Inactive X2 link information is available with NBS from Array <X2APInact, j>, trigger X2 link creation event from SBS to NBS.

After performing 502 to 506, the updated information based on consolidation of the one or more X2 links is stored in semi-persistent memory of dynamic X2 AP 204 and is also communicated to MA 210 through MAI 212.

Figure 6:
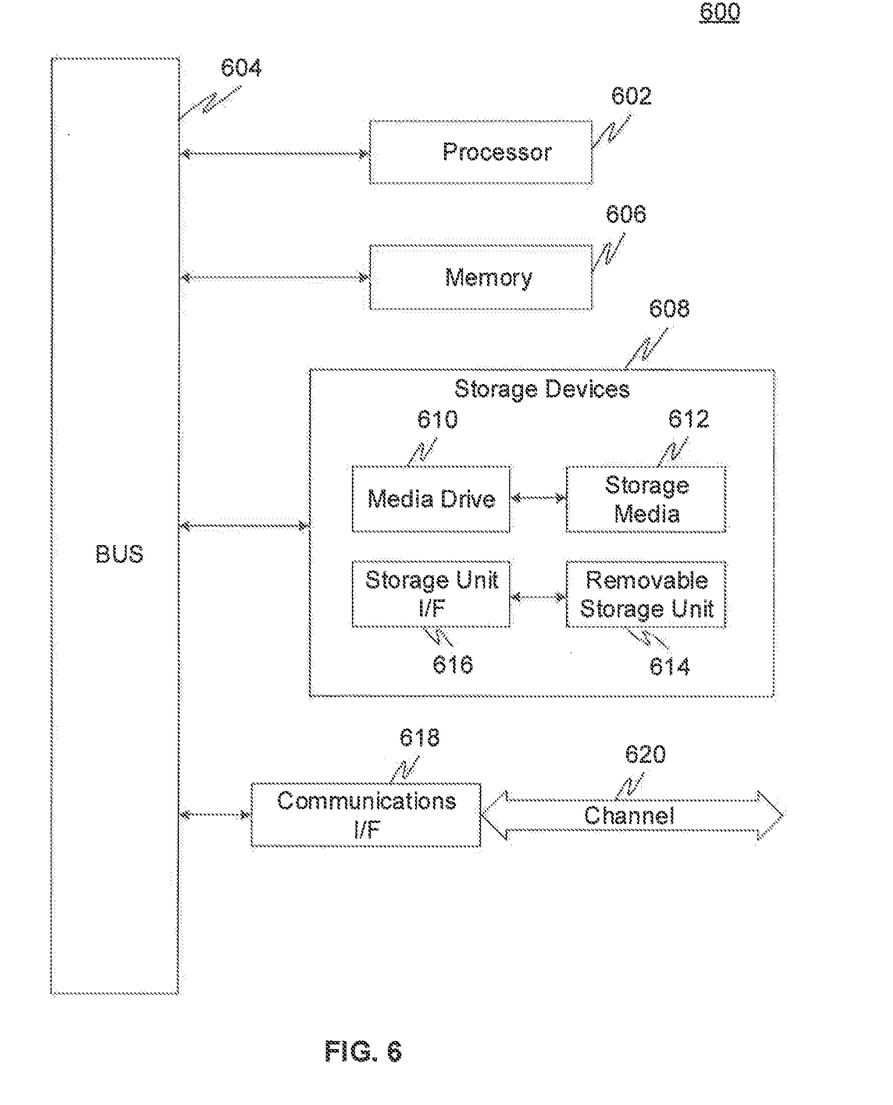
FIG. 6 illustrates an exemplary computing system that may be employed to implement processing functionality for various embodiments.

FIG. 6 illustrates an exemplary computing system 600 that may be employed to implement processing functionality for various embodiments (e.g., as a SIMD device, client device, server device, one or more processors, or the like). Those skilled in the relevant art will also recognize how to implement the invention using other computer systems or architectures. Computing system 600 may represent, for example, a user device such as a desktop, an activity mon monitoring device, a wearable portable electronic device, a mobile phone, personal entertainment device, DVR, and so on, or any other type of special or general purpose computing device as may be desirable or appropriate for a given application or environment. Computing system 600 can include one or more processors, such as a processor 602 that can be implemented using a general or special purpose processing engine such as, for example, a microprocessor, microcontroller or other control logic. In this example, processor 602 is connected to a bus 604 or other communication medium.

Computing system 600 can also include a memory 606 (main memory), for example, Random Access Memory (RAM) or other dynamic memory, for storing information and instructions to be executed by processor 602. Memory 606 also may be used for storing temporary variables or other intermediate information during execution of instructions to be executed by processor 602. Computing system 600 may likewise include a read only memory ("ROM") or other static storage device coupled to bus 604 for storing static information and instructions for processor 602.

Computing system 600 may also include storage devices 608, which may include, for example, a media drive 610 and a removable storage interface. The media drive 610 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 612 may include, for example, a hard disk, magnetic tape, flash drive, or other fixed or removable medium that is read by and written to by media drive 610. As these examples illustrate, storage media 612 may include a computer-readable storage medium having stored therein particular computer software or data.

In alternative embodiments, storage devices 608 may include other similar instrumentalities for allowing computer programs or other instructions or data to be loaded into computing system 600. Such instrumentalities may include, for example, a removable storage unit 614 and a storage unit interface 616, such as a program cartridge and cartridge Interface, a removable memory (for example, a flash memory or other removable memory module) and memory slot, and other removable storage units and interfaces that allow software and data to be transferred from removable storage unit 614 to computing system 600.

Computing system 600 can also include a communications interface 618. Communications interface 618 can be used to allow software and data to be transferred between computing system 600 and external devices. Examples of communications interface 618 can include a network interface (such as an Ethernet or other NIC card), a communications port (such as for example, a USB port, a micro USB port), Near field Communication (NFC), etc. Software and data transferred via communications interface 618 are in the form of signals which can be electronic, electromagnetic, optical, or other signals capable of being received by communications interface 618. These signals are provided to communications interface 618 via a channel 620. Channel 620 may carry signals and may be implemented using a wireless medium, wire or cable, fiber optics, or other communications medium. Some examples of channel 620 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 606, storage devices 608, removable storage unit 614, or signal(s) on channel 620. These and other forms of computer-readable media may be involved in providing one or more sequences of one or more instructions to processor 602 for execution. Such instructions, generally referred to as "computer program code" (which may be grouped in the form of computer programs or other groupings), when executed, enable computing system 600 to perform features or functions of embodiments of the present invention.

In an embodiment where the elements are implemented using software, the software may be stored in a computer-readable medium and loaded into computing system 600 using, for example, removable storage unit 614, media drive 610 or communications interface 618. The control logic (in this example, software instructions or computer program code), when executed by processor 602, causes processor 602 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for managing X2 links in wireless communication networks. Determination of priority associated with UEs along with X2 link usage pattern, enables optimum establishment of X2 links. This results in limiting maximum X2 Links of a BS, thereby optimizing load on the network. The priority determined for a UE is used to prioritize X2 link creation during handover for prioritized UEs, as a result, the quality of service is not impacted. Moreover, as the time period for which an active X2 link may remain unused is predicted, efficient termination (partial or full) of X2 links is enabled.

The specification has described methods and systems for management of X2 links in wireless communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing X2 links in a wireless communication network, the method comprising:
   computing a set of configuration parameters associated with at least one Neighboring Base Station (NBS) using measurement reports received from a plurality of User Equipment (UEs) communicating with the at least one NBS;
   determining feasibility of setting up at least one X2 link between a Serving Base Station (SBS) and the at least one NBS based on at least one configuration parameter in response to receiving an X2 link set up request;
   creating, in response to determining the feasibility, the at least one X2 link by performing one of activation of an X2 link and initiation of setup of an X2 link for each of the at least one X2 link based on a current status of each of the at least one X2 link, wherein a current status of an X2 link comprises one of a new link setup requirement and activation of an already established X2 link for one of the at least one NBS;
   determining a current usage of each of the at least one X2 link created between the SBS and one of the at least one NBS;
   predicting a future usage of each of the at least one X2 link based on UE measurement reports received from the plurality of UEs and at least one configuration parameter; and
   consolidating the at least one of X2 links based on associated current usage and associated predicted future usage.

2. The method of claim 1, wherein the set of configuration parameters is selected from a group comprising a default Nearest Base Station (NBS) List, a measurement Timer, a Threshold Reference Signal Received Power (RSRP) Deviation, a threshold time Interval for link deactivation, threshold non-usage time for an active X2 Link, a handover failure factor, a threshold number User Equipment (UEs), Quality Control Index (QCI) for UEs, maximum X2 links, and a radio link failure factor.

3. The method of claim 1 further comprising determining status for the at least one X2 link based on feasibility of setting up the at least one X2 links.

4. The method of claim 1, wherein determining current usage of each of the at least one X2 link comprises analyzing handover reports associated with each of the at least one NBS.

5. The method of claim 1, wherein predicting future usage comprises:
   calculating an NBS RSRP change rate for each of the at least one NBS and a SBS RSRP change rate for the SBS based on associated consecutive UE measurement reports received from each UE; and
   identifying at least one potential UE for handover based on each NBS RSRP change rate computed for the at least one NBS and the SBS RSRP change rate.

6. The method of claim 5 further comprising:
   computing, for each UE associated with SBS and the at least one NBS, a predicted RSRP SBS value and a predicted RSRP NBS value; and
   verifying, for each UE associated with SBS and the at least one NBS, associated predicted RSRP SBS value and associated predicted RSRP NBS value with threshold limit of RSRP error deviation.

7. The method of claim 6, wherein consolidating comprises:
   computing a predicted non-usage time of each of the at least one X2 link based on an associated predicted RSRP SBS value and an associated predicted RSRP NBS value; and
   terminating one of the at least one X2 link when associated predicted non-usage time is greater than a threshold non-usage time for an active X2 link.

8. The method of claim 1, wherein consolidating comprises recreating one of the at least one X2 link based on comparison of total number of UEs, quality control index of each UE, and number of X2 links with respective thresholds.

9. The method of claim 1 further comprising determining network resources required for using and maintaining the at least one X2 link in response to creating the at least one X2 link.

10. A system for managing X2 links in a wireless communication network, the system comprising:
    at least one processor; and
    a non-transitory computer-readable medium storing instructions that, when executed by the at least one processor, cause the at least one processor to perform operations comprising:
       computing a set of configuration parameters associated with at least one Neighboring Base Station (NBS)

using measurement reports received from a plurality of User Equipment (UEs) communicating with the at least one NBS;

determining feasibility of setting up at least one X2 link between a Serving Base Station (SBS) and the at least one NBS based on at least one configuration parameter in response to receiving an X2 link set up request;

creating, in response to determining the feasibility, the at least one X2 link by performing one of activation of an X2 link and initiation of setup of an X2 link for each of the at least one X2 link based on current status of each of the at least one X2 link, wherein current status of an X2 link comprises one of a new link setup requirement and activation of an already established X2 link for one of the at least one NBS;

determining a current usage of each of the at least one X2 link created between the SBS and one of the at least one NBS;

predicting a future usage of each of the at least one X2 link based on UE measurement reports received from the plurality of UEs and at least one configuration parameter; and consolidating the at least one of X2 links based on associated current usage and associated predicted future usage.

11. The system of claim 10, wherein the operations further comprise determining status for the at least one X2 link based on feasibility of setting up the at least one X2 links.

12. The system of claim 10, wherein the operation of determining current usage of each of the at least one X2 link comprises operation of analyzing handover reports associated with each of the at least one NBS.

13. The system of claim 10, wherein the operation of predicting future usage comprises operation of:

calculating an NBS RSRP change rate for each of the at least one NBS and a SBS RSRP change rate for the SBS based on associated consecutive UE measurement reports received from each UE; and identifying at least one potential UE for handover based on each NBS RSRP change rate computed for the at least one NBS and the SBS RSRP change rate.

14. The system of claim 13, wherein the operations further comprise:

computing, for each UE associated with SBS and the at least one NBS, a predicted RSRP SBS value and a predicted RSRP NBS value; and verifying, for each UE associated with SBS and the at least one NBS, associated predicted RSRP SBS value and associated predicted RSRP NBS value with threshold limit of RSRP error deviation.

15. The system of claim 14, wherein operation of consolidating further comprises the operation of:

computing a predicted non-usage time of each of the at least one X2 link based on an associated predicted RSRP SBS value and an associated predicted RSRP NBS value; and terminating one of the at least one X2 link when associated predicted non-usage time is greater than a threshold non-usage time for an active X2 link.

16. The system of claim 1, wherein the operation of consolidating comprises the operation of recreating one of the at least one X2 link based on comparison of total number of UEs, quality control index of each UE, and number of X2 links with respective thresholds.

17. The system of claim 10, wherein the operations further comprise determining network resources required for using and maintaining the at least one X2 link in response to creating the at least one X2 link.

18. The system of claim 10, wherein the set of configuration parameters is selected from a group comprising a default Nearest Base Station (NBS) List, a measurement Timer, a Threshold Reference Signal Received Power (RSRP) Deviation, a threshold time Interval for link deactivation, threshold non-usage time for an active X2 Link, a handover failure factor, a threshold number User Equipment (UEs), Quality Control Index (QCI) for UEs, maximum X2 links, and a radio link failure factor.

19. A non-transitory computer-readable storage medium for managing X2 links in a wireless communication network, when executed by a computing device, cause the computing device to:

compute a set of configuration parameters associated with at least one Neighboring Base Station (NBS) using measurement reports received from a plurality of User Equipment (UEs) communicating with the at least one NBS;

determine feasibility of setting up at least one X2 link between a Serving Base Station (SBS) and the at least one NBS based on at least one configuration parameter in response to receiving an X2 link set up request;

create, in response to determining the feasibility, the at least one X2 link by performing one of activation of an X2 link and initiation of setup of an X2 link for each of the at least one X2 link based on current status of each of the at least one X2 link, wherein current status of an X2 link comprises one of a new link setup requirement and activation of an already established X2 link for one of the at least one NBS;

determine a current usage of each of the at least one X2 link created between the SBS and one of the at least one NBS;

predict a future usage of each of the at least one X2 link based on UE measurement reports received from the plurality of UEs and at least one configuration parameter; and consolidate the at least one of X2 links based on associated current usage and associated predicted future usage.

20. The non-transitory computer-readable storage medium of claim 19, wherein the set of configuration parameters is selected from a group comprising a default Nearest Base Station (NBS) List, a measurement Timer, a Threshold Reference Signal Received Power (RSRP) Deviation, a threshold time Interval for link deactivation, threshold non-usage time for an active X2 Link, a handover failure factor, a threshold number User Equipment (UEs), Quality Control Index (QCI) for UEs, maximum X2 links, and a radio link failure factor.

* * * * *